United States Patent
Picart et al.

(10) Patent No.: US 10,120,334 B2
(45) Date of Patent: Nov. 6, 2018

(54) SELF-REFERENCE HOLOGRAPHIC IMAGING SYSTEM

(71) Applicants: CENTRE NATIONAL DE LA RECHERCHE SCIENTIFIQUE, Paris (FR); UNIVERSITE DU MAINE, INSTITUT DES MOLECULES ET MATERIAUX DU MANS, Le Mans (FR)

(72) Inventors: Pascal Picart, Le Mans (FR); Mokrane Malek, Le Mans (FR)

(73) Assignees: CENTRE NATIONAL DE LA RECHERCHE SCIENTIFIQUE, Paris (FR); UNIVERSITE DU MAINE, INSTITUT DES MOLECULES ET MATERIAUX DU MANS (IMMM-UMR 6283), Le Mans (FR)

( * ) Notice: Subject to any disclaimer, the term of this patent is extended or adjusted under 35 U.S.C. 154(b) by 294 days.

(21) Appl. No.: 14/439,630

(22) PCT Filed: Oct. 28, 2013

(86) PCT No.: PCT/EP2013/072474
§ 371 (c)(1),
(2) Date: Apr. 29, 2015

(87) PCT Pub. No.: WO2014/067886
PCT Pub. Date: May 8, 2014

(65) Prior Publication Data
US 2015/0293498 A1    Oct. 15, 2015

(30) Foreign Application Priority Data
Oct. 30, 2012    (FR) .................................... 12 60353

(51) Int. Cl.
*G03H 1/04* (2006.01)
*G03H 1/00* (2006.01)
(Continued)

(52) U.S. Cl.
CPC ......... *G03H 1/0443* (2013.01); *G03H 1/0011* (2013.01); *G03H 1/28* (2013.01);
(Continued)

(58) Field of Classification Search
CPC ...... G03H 1/0443; G03H 1/28; G03H 1/0011; G03H 2227/03; G03H 2001/045;
(Continued)

(56) References Cited

U.S. PATENT DOCUMENTS 6,975,576 B1 * 12/2005 Uchiyama ............ G11B 7/0903
                                                    369/112.15
2007/0146700 A1 * 6/2007 Kowarz ................... G01J 3/02
                                                    356/310
(Continued)

OTHER PUBLICATIONS

J. Rosen et al., "Fresnel incoherent correlation holography (FINCH): a review of research," Adv. Opt. Techn., vol. 1 (2012), pp. 151-169.
(Continued)

*Primary Examiner* — Joseph Suh
(74) *Attorney, Agent, or Firm* — Baker & Hostetler LLP (57) ABSTRACT

A system for recording a digital hologram of an object comprises: a coherent source intended to illuminate the object and thus produce a wave diffracted by the object; and a digital sensor intended to record the digital hologram of the object. It furthermore comprises a spatial phase modulating assembly able to produce in the plane of the sensor a plurality of duplicates of the wave diffracted by the object, the duplicates being offset from each other but overlapping partially, these duplicates forming on the sensor a digital (Continued)

hologram of the object, this hologram being what is referred to as a self-reference hologram.

13 Claims, 6 Drawing Sheets

(51) Int. Cl.
   *G03H 1/28* (2006.01)
   *G03H 1/26* (2006.01)

(52) U.S. Cl.
   CPC ....... *G03H 1/265* (2013.01); *G03H 2001/005* (2013.01); *G03H 2001/045* (2013.01); *G03H 2001/0447* (2013.01); *G03H 2001/0458* (2013.01); *G03H 2001/266* (2013.01); *G03H 2225/12* (2013.01); *G03H 2225/32* (2013.01); *G03H 2227/03* (2013.01)

(58) Field of Classification Search
   CPC ....... G03H 2001/0458; G03H 2225/32; G03H 2001/005; G03H 2225/12; G03H 1/265; G03H 2001/266; G03H 2001/0447
   See application file for complete search history.

(56) References Cited

U.S. PATENT DOCUMENTS

| | | | |
|---|---|---|---|
| 2009/0080318 A1* | 3/2009 | Tatsuta | G11B 7/0901 369/112.07 |
| 2009/0303571 A1* | 12/2009 | Sandstrom | G02B 5/1809 359/291 |
| 2010/0194854 A1* | 8/2010 | Kroll | G02B 26/005 348/40 |
| 2012/0242970 A1* | 9/2012 | Smilde | G03F 7/70483 355/77 |
| 2014/0036329 A1* | 2/2014 | Kang | G03H 1/2294 359/9 |
| 2014/0168401 A1* | 6/2014 | De Bruijn | G06F 3/013 348/78 |
| 2014/0355985 A1* | 12/2014 | Chu | G02F 1/292 398/49 |

OTHER PUBLICATIONS

Etienne Cuche et al., "Simultaneous amplitude-contrast and quantitative phase-contrast microscopy by numerical reconstruction of Fresnel off-axis holograms," Applied Optics, vol. 38, No. 34, Dec. 1999, pp. 6994-7001.
Ichirou Yamaguchi et al., "Image formation in phase-shifting digital holography and applications to microscopy," Applied Optics, vol. 40, No. 34, Dec. 2001, pp. 6177-6186.
Jonas Kühn et al., "Real-time dual-wavelength digital holographic microscopy with a single hologram acquisition," Optics Express, vol. 15, No. 12, Jun. 11, 2007, pp. 7231-7242.
Wonshik Choi et al., "Tomographic phase microscopy," Nature Methods, vol. 4, Aug. 12, 2007, p. 717.
Robert T. Frankot et al., "A Method for Enforcing Integrability in Shape from Shading Algorithms," IEEE Transactions on Pattern Analysis and Machine Intelligence, vol. 10, No. 4, Jul. 1988, pp. 439-451.
Jun-Chang Li et al., "Digital holographic reconstruction of large objects using a convolution approach and adjustable magnification," Optics Letters, vol. 34, No. 5, Mar. 1, 2009, pp. 572-574.
V. Mico, et al., "Superresolved Phase-Shifting Gabor Holography by CCD Shift", Journal of Optics A: Pure and Applied Optics, Dec. 1, 2009, 125408 pp. 1-6, vol. 11, No. 12, Institute of Physics Publishing, Bristol, GB, XP020169699.
Vincente Mico, et al., "Phase-Shifting Gabor Holography", Optics Letters, May 15, 2009, pp. 1492-1494, vol. 34, No. 10, Optical Society of America, Washington, DC, USA, XP001523909.
Etienne Cuche, et al., "Simultaneous Amplitude-Contrast and Quantitative Phase-Contrast Microscopy by Numerical Reconstruction of Fresnel Off-Axis Holograms", Applied Optics, Dec. 1, 1999, pp. 6994-7001, vol. 38, No. 34.
Jonas Kuhn, et al, "Real-Time Dual-Wavelength Digital Holographic Microscopy with a Single Hologram Acquisition", Optics Express, 2007, pp. 7231-7242, vol. 15, issue 12.
Wonshik Choi, et al., "Tomographic Phase Microscopy", Nature Methods, Aug. 12, 2007, pp. 1-3, Nature Publishing Group.
Robert T. Frankot, et al., "A Method for Enforcing Integrability in Shape from Shading Algorithms", IEEE Transactions on Pattern Analysis and Machine Intelligence, Jul. 1988, pp. 439-451, vol. 10, No. 4, IEEE.

* cited by examiner

SELF-REFERENCE HOLOGRAPHIC IMAGING SYSTEM

CROSS-REFERENCE TO RELATED APPLICATIONS

This application is a National Stage of International patent application PCT/EP2013/072474, filed on Oct. 28, 2013, which claims priority to foreign French patent application No. FR 1260353, filed on Oct. 30, 2012, the disclosures of which are incorporated by reference in their entirety.

FIELD OF THE INVENTION

The field of the invention is that of digital holographic imaging such as holographic microscopy, notably applied to 3D imaging of micro-objects.

BACKGROUND

Existing methods for observing and characterizing living cells such as microorganisms (bacteria, algae, yeasts, etc.) are often invasive and lead to the destruction of the observed sample or to its modification during preparation of the sample—for example, in the case of electron microscopy, water removal occurs under vacuum. This destruction and modification may thus cause artifacts and lead to interpretational problems.

Conventional microscopy techniques based on optical radiation do not allow quantitative information to be obtained on the refractive index or permittivity of samples because they are only capable of detecting the intensity of the light diffracted by these objects, and thus their applicability is restricted in many cases. Their resolution is also diffraction limited.

Digital holographic imaging allows an absolute three-dimensional map to be obtained both of refractive index and permittivity or of the shape of a structured surface (whether transparent or not) with a subwavelength resolution in the visible domain, and therefore with a resolution of less than one micron. Such a tool has many applications in biology and nanotechnology (functionalization of surfaces, polymer films of nanoscale thickness, carbon nanotubes, nanowires, etc.), such as for example 3D tomography of microorganisms, the study of the internal structure of unmarked cells or even quality control in the production of etched components typically of a few hundred nanometers in size. It allows life to be studied in its environment without having to disrupt it (bacterial biofilms in networks for supplying drinking water, pathogenic bacteria in the food processing or health fields, etc.).

Figure 1:
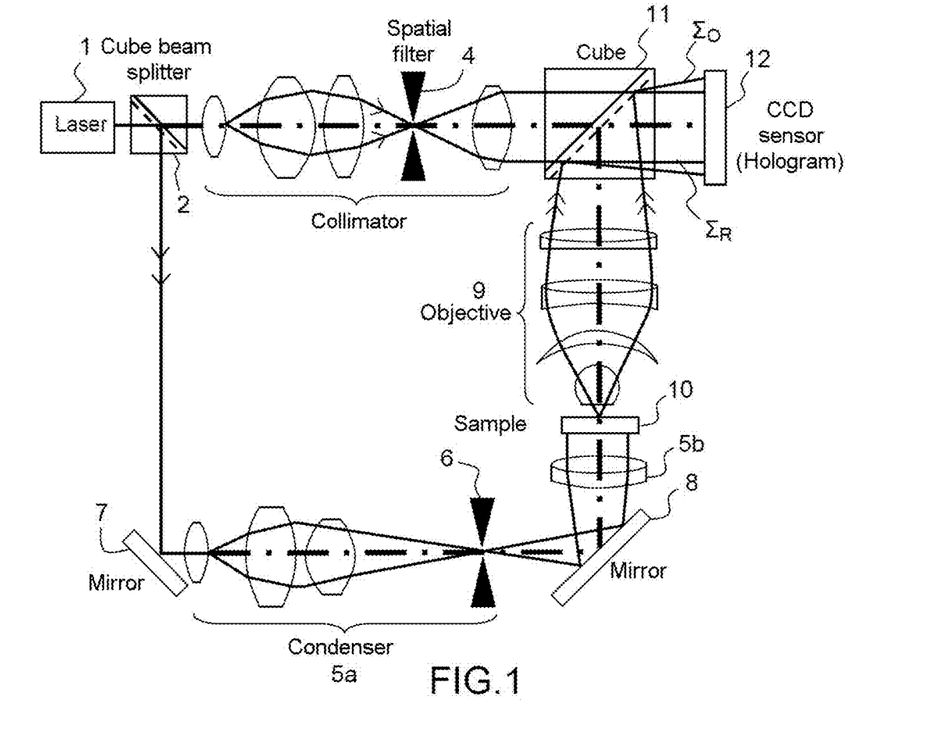
FIG. 1, described above, schematically shows an example prior-art holographic microscope.

An example of a digital holographic microscope based on the principle of what is referred to as "off-axis" holography is described with reference to FIG. 1. It comprises a source 1 of coherent light such as a laser that sends a beam to a first cube beam splitter 2. A first portion of the beam is shaped by means of a collimator 3 including a spatial filter 4, in order to form a reference wave $\Sigma_R$ that is slightly inclined relative to the optical axis (hence the term "off-axis") and that is detected through a second cube beam splitter 11 by a digital sensor 12 such as a CCD or CMOS camera. The other portion of the beam, issued from the first cube beam splitter, is shaped by means of another collimator 5a-5b including another spatial filter 6, then transmitted (as shown in this figure) or reflected to a sample or object 10. The wave diffracted by this sample is enlarged by means of an objective 9 that, with the second cube beam splitter 11, forms the image of the sample in the proximity of the sensor 12. The diffracted and enlarged wave $\Sigma_O$ interferes with the reference wave $\Sigma_R$, thus forming a hologram on the sensor 12. This microscope records a digital hologram of the wave diffracted by the object.

Apart from the fact that such a recording configuration is bulky, it is in addition sensitive to external perturbations that modify the optical paths of the reference wave and the wave diffracted by the object and thus degrade the hologram, thereby hindering observation of the object and its reconstruction. This is accentuated during the observation of dynamic effects.

Provided that a hologram is successfully obtained, the amplitude and phase of the object are numerically reconstructed using known methods such as for example described in the publication CUCHE E., MARQUET P., DEPEURSINGE C., "Simultaneous amplitude-contrast and quantitative phase-contrast microscopy by numerical reconstruction of Fresnel off-axis holograms", Applied Optics, Vol. 38, p. 6994-7001, 1999:

- by calculating the spectrum of the hologram, for example by applying a discrete Fourier transform (DFT);
- by digitally filtering the lobe of the spectrum representative of the amplitude and phase of the object; and
- by calculating the inverse DFT of the filtered lobe in order thus to obtain an amplitude image and a phase image of the object.

A step of numerical focusing is advantageously applied to the images obtained.

The calculation of the complex amplitude of the wave front of the object (also designated the complex amplitude of the wave of the object) in the plane of the sensor, denoted $A=a\cdot\exp(i\varphi)$, may be expressed by the two equations (1) and (2):

$$a = |DFT^{-1}\{f[DFT\{H\}]\}| \quad (1)$$

$$\varphi = \arg(DFT^{-1}\{f[DFT\{H\}]\}) \quad (2)$$

where H is the recorded hologram, a and $\varphi$ are the modulus and the phase of the complex amplitude, respectively, and f[ . . . ] represents the process of digitally filtering the lobe of the spatial frequency spectrum representative of the amplitude and phase of the object. DFT{ . . . } and $DFT^{-1}\{$ . . . $\}$ are the direct and inverse discrete Fourier transform operators, respectively, and arg( . . . ) is the argument of the complex amplitude (i.e. its phase). These equations do not contain correcting terms that could optionally be applied to the calculation.

There is another digital holography technique (less common than off-axis holography) called "in-line" holography, which uses a reference beam oriented in the same direction as the object beam. With this technique, only the amplitude of the object is accessible. This is because the superposition of the object beam $\Sigma_O$ and reference beam $\Sigma_R$ limits the measurement of phase from the recorded holograms. The advantage of this technique in certain applications (study of opaque objects for example) is the simplicity of its implementation as it does not require fine adjustment of the reference beam. It is also possible to bypass the superposition of diffraction orders due to the "in-line" character by modulating the reference wave (what is referred to as the "phase shift" method). However, this approach requires at least three phase-shifted holograms (4 in general) to be recorded in sequence, which limits the method in the study of dynamic effects, as described in the publication YAMA-GUCHI I., KATO J., OHTA S., MIZUNO J., "Image formation in phase shifting digital holography and application to microscopy", Applied Optics, Vol. 40, p. 6177-6186, 2001.

At the present time, there remains a need for a system that is satisfactory both in terms of bulk and sensitivity to exterior perturbations and that is applicable to the study of dynamic effects.

SUMMARY OF THE INVENTION

The invention relates to a self-reference digital holographic recording system and its corresponding reconstructing method.

In the system provided, amplitude and phase coding is made possible by virtue of the use of a diffractive element, namely a spatial light modulator (SLM). This is programmed (or etched into a photosensitive medium) in order to generate a periodic grating (for example having one or more periods) allowing identical duplicates of the field diffracted by the object illuminated by the light source to be produced. These duplicates are redirected toward the sensor, which is positioned in a specific way, in order to generate a hologram allowing, via numerical calculation, the phase and amplitude of the studied object to be extracted.

More precisely, it is a question of a system for recording a digital hologram of an object, which comprises:
 a partially coherent or coherent source intended to illuminate the object and thus produce a wave diffracted by the object; and
 a digital sensor intended to record the digital hologram of the object.

It is mainly characterized in that it furthermore comprises a spatial phase modulating assembly consisting of:
 a spatial phase modulator located between the object and the sensor, associated with
 a first image-forming device able to form the image A" of the object at a distance $\Delta z1$ from the spatial phase modulator; and
 a second image-forming device able to form:
  the image of the plane of the spatial phase modulator, in a plane located at a non-zero distance $\Delta z2$ from the plane of the sensor; and
  the image A' of the image A" of the object, in a plane located at a distance $\Delta z'$ from the plane of the sensor,
 this modulating assembly being able to produce in the plane of the sensor a plurality of duplicates of the wave diffracted by the object, said duplicates being offset from each other but overlapping partially, these duplicates forming on the sensor a digital hologram of the object, this hologram being what is referred to as a self-reference hologram.

Thus, a digital hologram of one or more spatial derivatives of the wave diffracted by the object is obtained.

The advantage of this recording system lies in the fact that to record the digital hologram there is absolutely no need to use a reference beam in the optical set-up because the hologram is self-referenced, i.e. the object wave itself produces its own reference. The wave issued from the object is duplicated laterally a number of times in order to produce interference in the plane of the sensor (and therefore is simultaneously duplicated), without this wave, issued from the object, needing to be mixed beforehand with a reference wave.

In contrast, a reference beam is necessary in the case of conventional holographic interferometry systems. Specifically, the latter require a reference beam to be used in order to record on a sensor information relating both to the amplitude and phase of the studied objects. Despite the robustness of these systems, it is often tricky to adjust the reference beam in order to extract correctly the phase and amplitude information, as was highlighted in the preamble.

In addition, the system according to the invention has the advantage of not being sensitive to exterior perturbations because the optical paths of the object wave and the reference wave are conjoint and identical.

According to one feature of the invention, the spatial phase modulator is a periodic grating, for example a one- or two-period grating.

The source may be spatially and/or temporally partially coherent or coherent.

According to another feature of the invention, the partially coherent or coherent source is a multi-wavelength source. The object being intended to be illuminated in a preset direction, the multi-wavelength source is preferably used with an illumination direction that is different for each wavelength.

The object is intended to be illuminated in transmission or in reflection.

Optionally, the recording system comprises means for modifying the direction of illumination of the object and thus is able to record, for various illumination directions, one hologram per illumination direction, and/or it comprises means for engendering a rotation of the object about a given axis, thus making it possible to record, for various angles of rotation, one hologram per angle of rotation.

The first image-forming device typically comprises a cube beam splitter, optionally associated with a lens and/or a microscope objective.

The second image-forming device generally comprises the same cube beam splitter, optionally associated with an afocal optical system.

Another subject of the invention is a numerical method for reconstructing the image of an object from a hologram of the object obtained by a recording system such as described, which comprises steps of:
 calculating, by DFT (discrete Fourier transform), the spatial frequency spectrum of the hologram, comprising a main spectral lobe and secondary spectral lobes; and
 digitally filtering a plurality of spectral lobes,
 characterized in that at least two lobes are filtered,
  the main lobe; and
  at least one secondary lobe,
 and in that it comprises steps of:
 from the filtered main lobe, calculating, in the plane of the sensor, the modulus of the complex amplitude of the wave diffracted by the object during the recording;
 for each filtered secondary lobe, calculating, by inverse DFT, in the plane of the sensor, the spatial derivative of the optical phase of the wave diffracted by the object in a direction set depending on the phase modulation of the modulator during the recording;
 integrating these spatial derivatives in order to obtain in the plane of the sensor the optical phase of the wave diffracted by the object; and
 combining the modulus of the complex amplitude and the optical phase to obtain in the plane of the sensor the complex wave diffracted by the object.

Optionally, it furthermore comprises a step of numerically focusing the image of the object, on the basis of the complex field diffracted by the object in the plane of the sensor.

The invention also relates to a computer program product, said computer program comprising: code instructions allowing the steps of the reconstructing method such as described to be carried out when said program is executed on a computer.

The invention also relates to a digital system for reconstructing the image of an object from a hologram obtained by a recording system such as described, which comprises means for implementing the reconstructing method such as described.

The implementing means are for example a computer equipped with the indicated computer program product.

The invention lastly relates to a holographic imaging system that comprises a recording system and a reconstructing system such as described.

BRIEF DESCRIPTION OF THE DRAWINGS

Other features and advantages of the invention will become apparent on reading the following detailed description, given by way of nonlimiting example and with reference to the appended drawings in which.

From one figure to another, elements that are the same have been referenced with the same references.

DETAILED DESCRIPTION

Conventionally, a system for holographic imaging of an object comprises a system for recording a hologram of the object and a system for reconstructing the object from the recorded hologram. Each of these systems is described separately below.

Figure 2A:
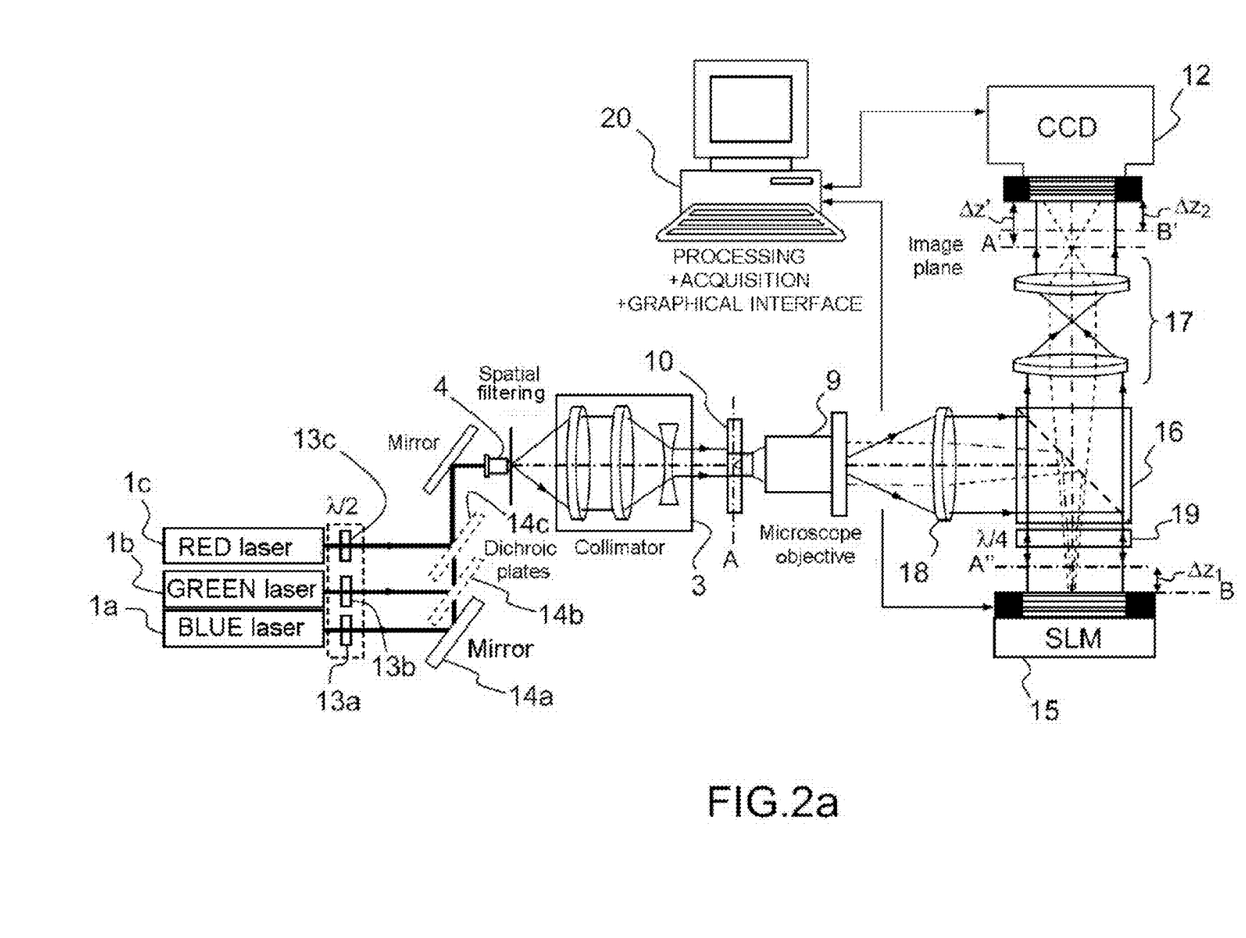
FIGS. 2a and 2b schematically show an example self-reference holographic recording system according to the invention for the case of an in-transmission configuration (FIG. 2a) and an in-reflection configuration (FIG. 2b), respectively.

FIG. 2a illustrates an example in-transmission configuration of a self-reference holographic microscopy recording system according to the invention. A coherent or partially coherent beam emitted by a laser source 1 or even a light-emitting diode, passes through a collimator 3 and illuminates the object A 10. A first optical imaging device, in this case a microscope objective 9 associated with a lens 18 and a polarizing cube beam splitter 16, forms on or in proximity to a spatial light modulator 15 (or SLM) the image A'' of the object A. The distance between the image A'' and the spatial light modulator 15 is denoted $\Delta z1$. If $\Delta z1 \neq 0$, propagation of the field A'' to the distance $\Delta z1$ in which the SLM 15 is located produces a blurred image, or more precisely the diffraction pattern of the image A'' in the plane of the SLM, which cannot therefore be in the Fourier plane of the image of the object, as may be seen in FIGS. 2a and 2b.

A second optical imaging device, in this case the same polarizing cube beam splitter 16 associated with an afocal optical system 17, forms of the image plane A'' an image A' on or in proximity to (upstream or downstream from) the plane of the sensor 12, at a distance $\Delta z'$. As will be seen below, the same second optical imaging device forms of the plane B of the SLM 15 an image B', at the distance $\Delta z2$ from the sensor 12.

If $\Delta z' \neq 0$, the propagation of the field A' to the distance $\Delta z'$ at which the sensor 12 is located produces a blurred image or more precisely the diffraction pattern of the image A' on the sensor plane, the blur possibly being compensated for by numerical reconstruction in a focusing step as will be seen below.

The SLM 15 may be used in reflection, as in the example in the figure, or in transmission.

A preferably multi-periodic programmed SLM phase grating 15' allows A'' (or the diffraction pattern of A'' in the plane of the SLM if $\Delta z1 \neq 0$) to be reflected in a plurality of directions. This phase grating may also be obtained using a diffractive optical element (DOE), such as a diffractive holographic element coded into a photosensitive silver gelatin illuminated in order to generate a periodic grating allowing identical duplicates of the field diffracted by the object illuminated by the light source to be produced in a plurality of directions.

Figure 3:
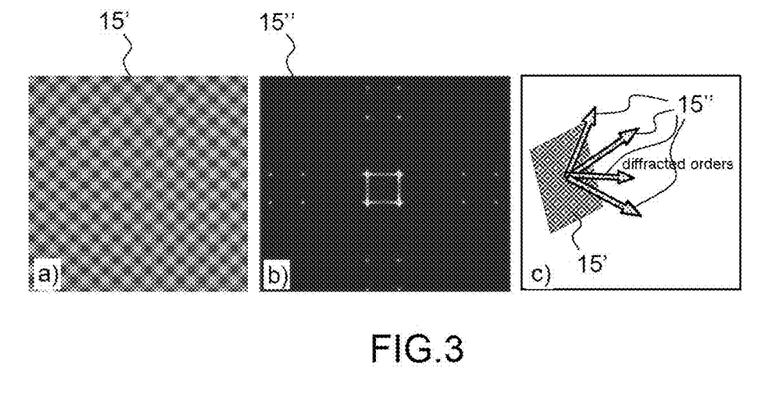
FIGS. 3a, 3b and 3c illustrate an example programmed SLM diffraction grating taking the form of a bi-periodic phase grating (FIG. 3a), its spatial frequency spectrum (FIG. 3b), and the orders diffracted by this grating (FIG. 3c), respectively.
Figure 5:
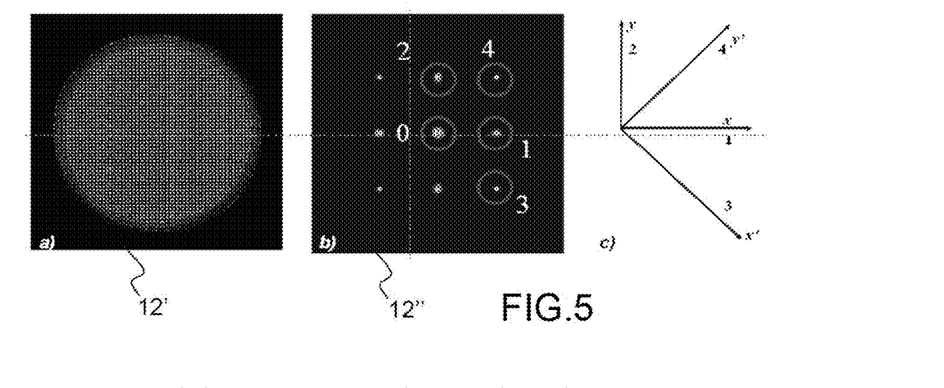
FIGS. 5a, 5b and 5c illustrate an example self-reference hologram recorded by a recording system according to the invention (FIG. 5a), its spatial frequency spectrum (FIG. 5b), and the axes of the coordinate systems in which the derivatives of the optical phase are calculated (FIG. 5c), respectively.

The directions are oriented symmetrically when the grating is multi-periodic. Below, by way of example, a multi-periodic pure phase grating is used, an example bi-directional pattern of which is shown in FIG. 3a, this grating therefore being able to form duplicates of A'' (or its diffraction pattern) in four different directions, as shown in FIG. 3c. The positions of the spatial frequencies of this grating 15', four in our example, are illustrated by the spatial frequency spectrum 15'' thereof shown in FIG. 3b. The spatial frequency spectrum 12'' of the self-reference hologram recorded with this grating 15' is shown in FIG. 5b.

A non-periodic grating could also be used, which would then orientate the optical field reflected by the modulator in asymmetric directions.

The sensor 12 is positioned so that the image B' of the plane B is formed by the second optical device 16-17, upstream (as shown in the figure) or downstream of the plane of the sensor, at the distance $\Delta z2$ so that, on the sensor, the duplicates are offset from each other by a non-zero amount while partially overlapping in order thus to form a self-reference hologram. The distance $\Delta z2$ thus allows a self-reference hologram to be formed with duplicates the characteristics of which are related to the offset generated by the distance $\Delta z2$, and to the variations in the wave engendered by the object 10. Adjustment of this distance $\Delta z2$ allows the parameters of the reconstructing method to be adjusted to obtain a better estimation of the phase and amplitude of the object 10.

The plane corresponding to a distance $\Delta z2$ of zero corresponds to the zero-sensitivity plane for which there is no offset between the duplicates and for which, therefore, no information is obtained on the wave variations engendered by the object 10.

When the SLM is not rigorously planar (when it is etched for example), the distances Δz', Δz1 and Δz2 are measured by considering, as the plane of the SLM, an average plane; this has no impact on the result provided that on the sensor the duplicates are offset while partially overlapping.

In our example, a self-reference hologram 12' is obtained with 4 duplicates one example of which is shown in FIG. 5a, and a distance Δz2 is chosen allowing an adjustable overlap to be obtained between these duplicates.

The polarizing cube beam splitter 16 is used to optimize, via a half-wave plate (λ/2) placed downstream of the light source, the amount of light incident on the modulator. A quarter-wave plate (λ/4) 19 advantageously adjusts the polarization of the light reflected (or transmitted) by the SLM in order to obtain an optimal transmission to the CCD sensor.

The sensor 12 and the SLM 15 are preferably controlled together by a computer 20 so as to synchronize the modulation of the SLM with the recording of the holograms 12' by the sensor.

Figure 2B:
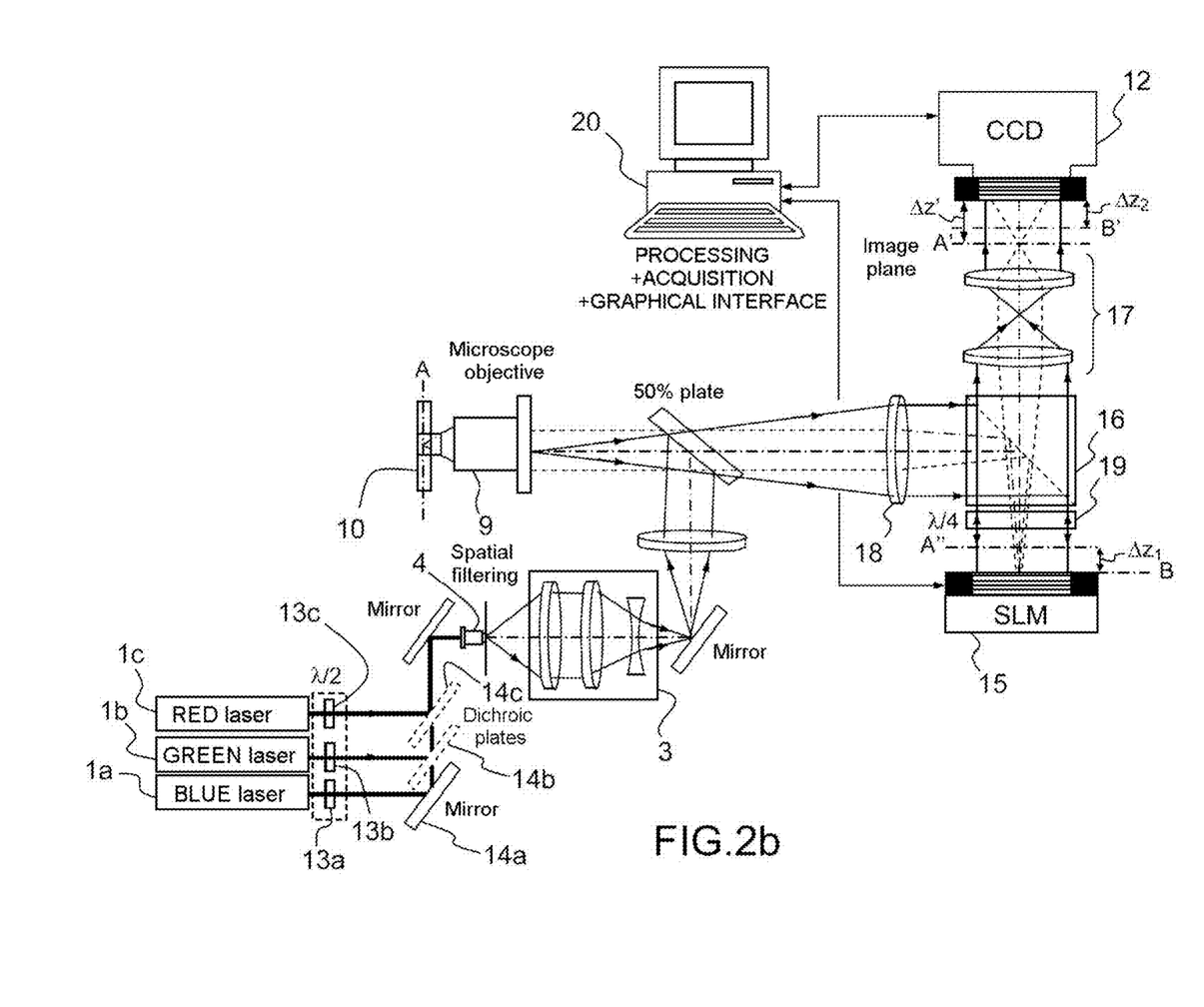

An example self-reference holographic microscope configured in an in-reflection configuration is shown in FIG. 2b. Its operation is similar to the microscope in FIG. 2a. The only difference lies in the way in which the object is illuminated, in reflection in this case.

A plurality of laser beams 1a, 1b, 1c, three for example, are advantageously used. Specifically, the use of three colors, namely red, green and blue, allows an RGB (red, green, blue) color image to be reconstructed without using white light. It is often paramount to observe a color image in microscopy as it also enables optical phase, and therefore relief, to be seen. Moreover, pairwise combination of the measurements of optical phase of the wave of the object (for example R-G, R-B or G-B) allows ambiguities related to phase jumps at 2π to be removed and thus the dynamic range of object profile measurements to be increased, in particular because the optical phase difference obtained by two different wavelengths engenders a synthetic wavelength of greater value, as explained in the publication by KUHN J., COLOMB T., MONTFORT F., CHARRIERE F., EMERY Y., CUCHE E., MARQUET P., DEPEURSINGE C., "Real-time dual-wavelength digital holographic microscopy with a single hologram acquisition", Optics Express, Vol. 15, p. 7231-7242, 2007. In case of phase ambiguity, it is therefore possible to record one self-reference hologram per color, or a plurality of self-reference holograms, each from two colors, engendering a synthetic color.

Figure 4:
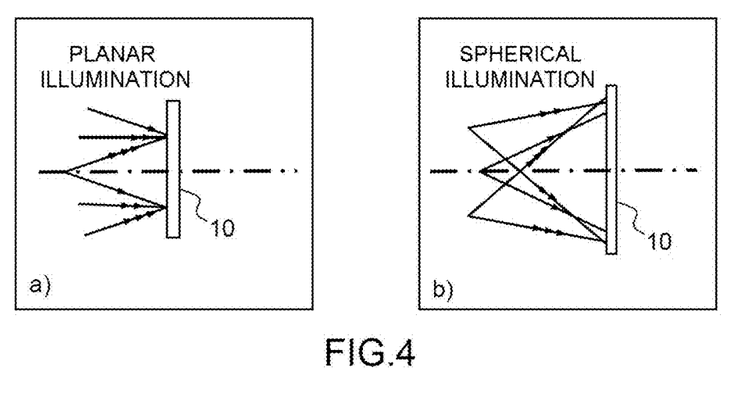
FIGS. 4a and 4b respectively illustrate two three-color planar (FIG. 4a) or spherical (FIG. 4b) modes for illuminating an object.

The ability to use 3 wavelengths also makes it possible to enrich the phase information. Thus, simultaneous planar or spherical illumination in a plurality of directions, as illustrated in FIGS. 4a and 4b, respectively (in the case of spherical illumination the direction is considered to be that of the central ray) allows, possibly in a single hologram, spatial/spectral information enabling a broader coverage of the spatial frequency spectrum of the object to be obtained simultaneously. Thus, it is possible to increase the transverse and axial resolutions by a factor of 2 relative to a conventional holographic microscope using a single wavelength, as described in the publication by CHOI W., FANG-YEN C., BADIZADEGAN K., OH S., LUE N., DASARI R., FELD M., "Tomographic phase microscopy", Nature Methods, Vol. 4, p. 717, 2007.

These laser beams 1a, 1b, 1c are combined with dichroic plates 14a, 14b, 14c matched to the laser sources. Each laser source is then associated with a half-wave plate 13a or 13b or 13c, and a dichroic plate located downstream of the half-wave plate. The quarter-wave plate 19 is chosen to be achromatic.

The illumination provided by the light sources may also be chosen to be partially temporally coherent or partially spatially coherent, or both at the same time.

Reconstruction of the image of the object is broached below.

From the hologram 12' recorded by a digital sensor 12 as indicated above, its spatial frequency spectrum 12" is calculated. A discrete Fourier transform is for example used for this calculation. An example spatial frequency spectrum 12" of a self-reference hologram recorded by a CCD sensor is illustrated in FIG. 5b.

On the basis of the frequency spectrum 12", filtering of the 0th order spectral spatial component and of 1st, 2nd, 3rd and 4th order spectral spatial components (four in this example because a bi-periodic grating is used) is carried out.

The 0th order component allows the modulus of the complex amplitude of the field diffracted by the object to be calculated. It is extracted by filtering in the spectral plane, then by calculation of the inverse discrete Fourier transform, and calculation of the modulus of the result obtained.

The calculation of the modulus of the complex amplitude of the wave front of the object in the plane of the sensor, denoted A=a·exp(iφ), may be expressed by equation (3):

$$a = |TFD^{-1}\{f_0[TFD\{H\}]\}| \quad (3)$$

where H is the recorded hologram, a and φ the modulus and phase of the complex amplitude, respectively, and $f_0[\ldots]$ represents the process of digital filtering of the 0th order component of the spatial frequency spectrum of the hologram.

The other spectral components (1st, 2nd, 3rd and 4th orders) allow the derivatives of the optical phase of the complex field diffracted by the object in the plane of the sensor to be calculated. In our example, the four derivatives are calculated in two Cartesian coordinate systems represented by the systems of axes (x,y) and (x',y') shown in FIG. 5c. By calculating the inverse DFT of each filtered lobe, an image of the spatial derivative of the optical phase of the wave diffracted by the object in a given direction x, y, x' or y' is obtained.

The calculation of the derivatives of the optical phase of the complex field, denoted A=a·exp(iφ), diffracted by the object in the plane of the sensor may be expressed by equations (4-7):

$$\frac{4\pi}{p_{slm}} \Delta z_2 \frac{\partial \varphi}{\partial x} = \arg(TFD^{-1}\{f_1[TFD\{H\}]\}) \quad (4)$$

$$\frac{4\pi}{p_{slm}} \Delta z_2 \frac{\partial \varphi}{\partial x} = \arg(TFD^{-1}\{f_2[TFD\{H\}]\}) \quad (5)$$

$$\frac{4\sqrt{2}\pi}{p_{slm}} \Delta z_2 \frac{\partial \varphi}{\partial x'} = \arg(TFD^{-1}\{f_3[TFD\{H\}]\}) \quad (6)$$

$$\frac{4\sqrt{2}\pi}{p_{slm}} \Delta z_2 \frac{\partial \varphi}{\partial y'} = \arg(TFD^{-1}\{f_4[TFD\{H\}]\}) \quad (7)$$

where $f_n[\ldots]$, n=1, 2, 3, 4, represents the process of digital filtering of the nth order component of the spectrum of the hologram (FIG. 5b) and $p_{slm}$ is the period (taking the form of a length along the axis in question) of the grating of the optical phase modulator.

These equations do not contain correcting terms that could optionally be applied to the calculation.

These spatial derivatives are integrated in order to obtain the optical phase of the wave diffracted by the object in the plane of the sensor. For this numerical integration calculation, one of the various methods proposed in the literature, and notably in the publication by FRANKOT R. T., CHELLAPPA R., "A method for enforcing integrability in shape from shading algorithms", in Shape from Shading (eds.), B. K. P. Horn and M. J. Brooks, M.I.T. Press, p. 89-122, 1989, may be used.

The modulus of the complex amplitude and the optical phase of the field diffracted by the object are then combined to obtain the complex wave diffracted by the object in the plane of the sensor.

This reconstructing method may be applied to each wavelength used to record a self-reference hologram, or to any one of these wavelengths.

This reconstructing method may be carried out with a digital system for reconstructing the image of an object, from a hologram obtained by a recording system such as described, which comprises means for implementing the reconstructing method described above.

This reconstructing method may notably be carried out with a computer program product, this computer program comprising: code instructions allowing the steps of the reconstructing method to be performed. It is recorded on a computer-readable medium, such as for example the computer 20 used for synchronizing the recording and modulation. The medium may be electronic, magnetic, optical, electromagnetic or be a storage medium read using infrared light. Such media are for example semiconductor memories (random access memory RAM or read-only memory ROM), tapes, floppy or magnetic disks or optical discs (read only memory compact discs (CD-ROMs), read/write compact disks (CD-R/W) and DVDs).

Figure 6A:
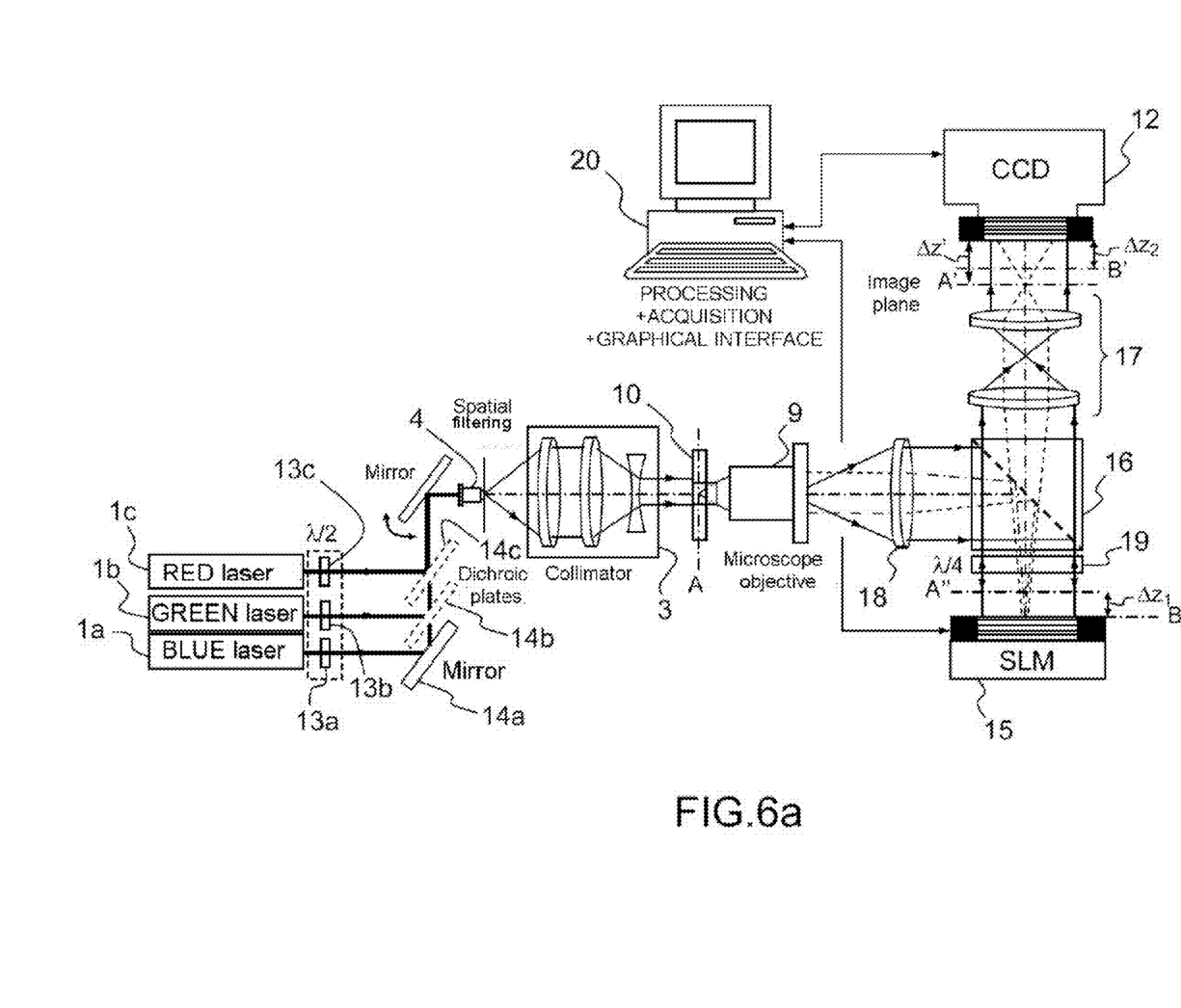
FIGS. 6a and 6b schematically show an example system for recording self-reference holograms in transmission (FIG. 6a) or in reflection (FIG. 6b), respectively, said system being equipped with scanning means in order to obtain a tomographic recording system according to the invention.
Figure 6B:
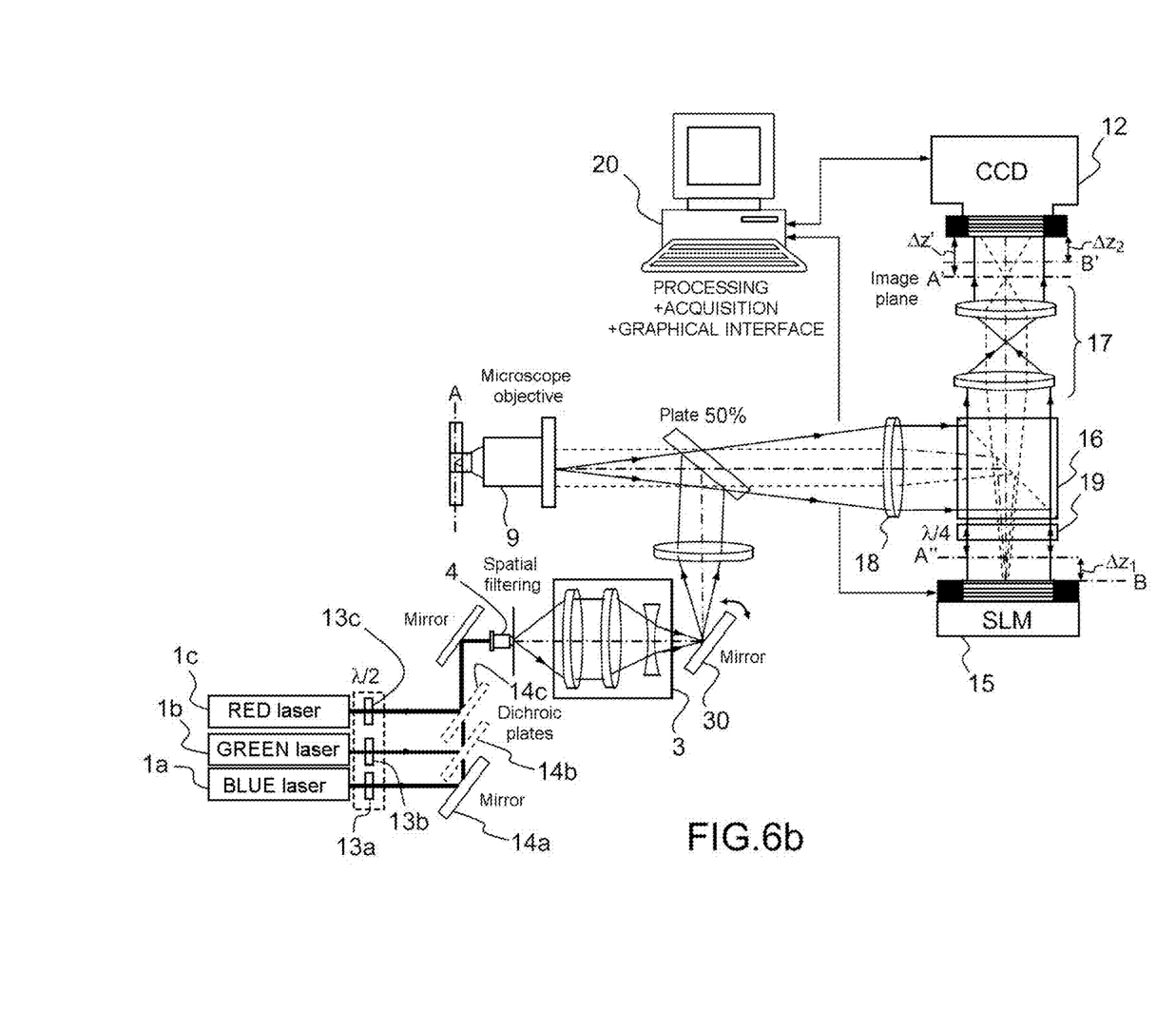

The holographic system may be enhanced to obtain a tomographic self-reference holography system. The tomographic aspect is for example obtained by scanning during the recording (FIGS. 6a and 6b). To do this, a rotary mirror 30, controlled by a computer 20 and synchronized with the sensor 12, is added to the architecture of the system in FIG. 2a, as shown in FIG. 6a, or added to the architecture of the system in FIG. 2b, as shown in FIG. 6b. It allows holograms to be recorded at various projection angles.

According to one alternative, the tomographic aspect is obtained using means for engendering a rotation of the object about a given axis, thus making it possible to record, for various angles of rotation, one hologram per angle of rotation.

An image is reconstructed for each recorded hologram, i.e. for each direction of illumination of the object. The images reconstructed for these various directions are then combined to calculate the 3D shape of the objects. The calculating method used is similar to that employed in diffractive tomography techniques.

The tomography system may also be obtained using a system exerting a rotation on the object about a given axis.

The fields of application are typically the following:

Biological imaging: study of biological specimens such as bacteria and microorganisms (3D tomography).

Material science: characterization of materials and structured surfaces.

Microtechnology: quality control of microsystems such as microaccelerometers, microphones on silicon, arrays of micromirrors, etc.

Figure 7:
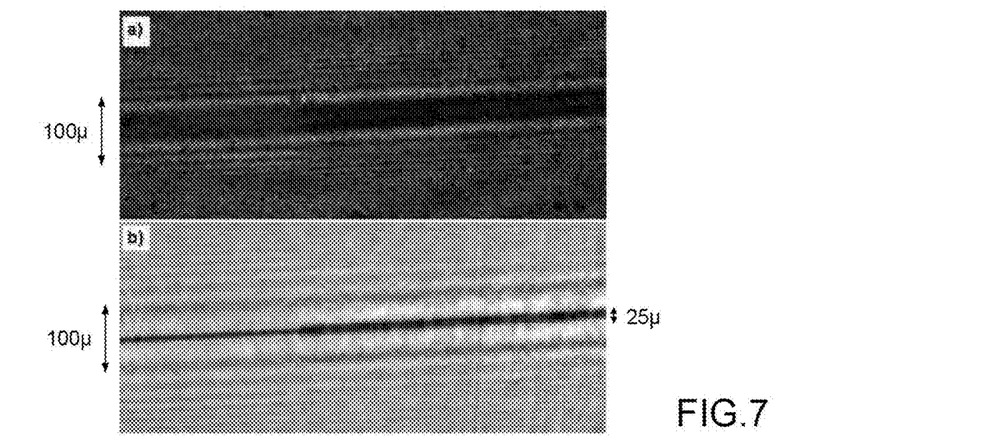
FIGS. 7a and 7b are examples of reconstructed images that are blurred (FIG. 7a) or numerically focused (FIG. 7b), respectively.

A self-reference holographic imaging system according to the invention was used to observe uncalibrated objects, such as 100 μm-diameter glass fibers the cladding of which had been peeled off (the left-hand portion of FIG. 7b). The holographic recording device was used without the microscope objective and the lens of the first image-forming device. The hologram was recorded with non-zero values of $\Delta z1$ and $\Delta z'$; the image reconstructed from the amplitude and phase measurements using the described reconstructing method was therefore blurred (see FIG. 7a). This image was focused (see FIG. 7b) numerically using the Fresnel integral calculated with the form of convolution described in the publication by LI J. C., TANKAM P., PENG Z., PICART P., "Digital holographic reconstruction of large objects using a convolution approach and adjustable magnification", Optics Letters, Vol. 34, p. 572-574, 2009.

The self-reference holographic imaging system was also used to observe a square-shaped pattern etched into a glass plate. In this example, the distance $\Delta z'$ is zero. In this case, and for this object, numerical focusing of the image of the object was not necessary. The image of the object was given by the calculated amplitude and phase.

The invention claimed is:

1. A system for recording a digital hologram of an object, comprising:
    a partially coherent or coherent source intended to illuminate the object and thus produce a wave diffracted by the object; and
    a digital sensor intended to record the digital hologram of the object, characterized in that it furthermore comprises a spatial phase modulating assembly consisting of:
    a spatial phase modulator located between the object and the sensor, associated with:
    a first image-forming device able to form an image A" of the object at a non-zero distance $\Delta z1$ from the spatial phase modulator; and
    a second image-forming device able to form:
        an image of the plane of the spatial phase modulator in a plane located at a non-zero distance $\Delta z2$ from a plane of the sensor; and
        an image A' of the image A" of the object, in a plane located at a distance $\Delta z'$ from the plane of the sensor,
    the modulating assembly being able to produce in the plane of the sensor a plurality of identical duplicates of the wave diffracted by the object, said identical duplicates being offset from each other but overlapping partially, the identical duplicates forming on the sensor a digital hologram of the object, the hologram being a self-reference hologram.

2. The system for recording a digital hologram as claimed in claim 1, wherein the spatial phase modulator is a periodic grating.

3. The system for recording a digital hologram as claimed in claim 1, wherein the modulating assembly is able to produce 4 duplicates in the plane of the sensor.

4. The system for recording a digital hologram as claimed in claim 1, wherein the source is spatially and/or temporally partially coherent.

5. The system for recording a digital hologram as claimed in claim 1, wherein the partially coherent or coherent source is a multi-wavelength source.

6. The system for recording a digital hologram as claimed in claim 5, wherein the object being intended to be illuminated in a preset direction, it comprises a multi-wavelength source with an illumination direction that is different for each wavelength.

7. The system for recording a digital hologram as claimed in claim 1, wherein the object is intended to be illuminated in transmission or in reflection.

8. The system for recording a digital hologram as claimed in claim 1, further comprising means for modifying the direction of illumination of the object and thus is able to record, for various illumination directions, one hologram per illumination direction.

9. The system for recording a digital hologram as claimed in claim 1, further comprising means for engendering a rotation of the object about a given axis, thus making it possible to record, for various angles of rotation, one hologram per angle of rotation.

10. The system for recording a digital hologram as claimed in claim 1, wherein the sensor is a CCD or CMOS camera.

11. The system for recording a digital hologram as claimed in claim 1, wherein the first image-forming device comprises a cube beam splitter.

12. The system for recording a digital hologram as claimed in claim 11, wherein the first image-forming device furthermore comprises a lens and/or a microscope objective.

13. The system for recording a digital hologram as claimed in claim 11 wherein the second image-forming device comprises the same cube beam splitter.

* * * * *